(12) United States Patent
Chee

(10) Patent No.: US 11,981,394 B2
(45) Date of Patent: May 14, 2024

(54) COUPLED STEERING TILTING AND EMBEDDED INDEPENDENT SUSPENSION SWING ARM SYSTEM FOR MULTI-WHEELED PERSONAL MOBILITY VEHICLES

(71) Applicant: GENEV LIMITED, Hong Kong (CN)

(72) Inventor: Tong Yu Chee, Hong Kong (CN)

(73) Assignee: GENEV LIMITED, Hong Kong (CN)

( * ) Notice: Subject to any disclaimer, the term of this patent is extended or adjusted under 35 U.S.C. 154(b) by 155 days.

(21) Appl. No.: 17/609,224

(22) PCT Filed: Aug. 14, 2020

(86) PCT No.: PCT/IB2020/057692
§ 371 (c)(1),
(2) Date: Nov. 5, 2021

(87) PCT Pub. No.: WO2022/034368
PCT Pub. Date: Feb. 17, 2022

(65) Prior Publication Data
US 2022/0306233 A1   Sep. 29, 2022

(51) Int. Cl.
*B62K 5/08*     (2006.01)
*B62K 5/00*     (2013.01)
*B62K 5/05*     (2013.01)
*B62K 21/00*    (2006.01)
*B62K 25/04*    (2006.01)

(52) U.S. Cl.
CPC ............... *B62K 5/08* (2013.01); *B62K 5/05* (2013.01); *B62K 21/00* (2013.01); *B62K 25/04* (2013.01); *B62K 2005/001* (2013.01)

(58) Field of Classification Search
CPC . B62K 5/08; B62K 5/05; B62K 21/00; B62K 25/04; B62K 2005/001; B62K 5/10; B62K 21/06; B62K 2204/00; B62K 3/002
See application file for complete search history.

(56) References Cited

U.S. PATENT DOCUMENTS

| | | | |
|---|---|---|---|
| 7,073,806 B2 | 7/2006 | Bagnoli | |
| 7,543,829 B1 | 6/2009 | Barnes | |
| 7,591,337 B2 | 9/2009 | Suhre et al. | |
| 7,967,306 B2 | 6/2011 | Mighell | |

(Continued)

FOREIGN PATENT DOCUMENTS

| | | |
|---|---|---|
| CN | 2446043 Y | 9/2001 |
| CN | 1386668 A | 12/2002 |

(Continued)

OTHER PUBLICATIONS

Wu, Left-right rear wheel steering automatic balancing and stabilizing device, Jul. 31, 2017 CN107416107A. Machine translation of description.*

(Continued)

*Primary Examiner* — Paul N Dickson
*Assistant Examiner* — Shams Dhanani
(74) *Attorney, Agent, or Firm* — MILES & STOCKBRIDGE P.C.; David R. Schaffer

(57) ABSTRACT

A coupled steering tilting and embedded independent shock absorption swing arm system (STS) system of a personal mobility vehicle, for example, but not limited to, a three-wheeled trike configuration, is disclosed.

18 Claims, 6 Drawing Sheets

(56) References Cited

U.S. PATENT DOCUMENTS

| | | | |
|---|---|---|---|
| 10,518,838 B2 * | 12/2019 | Chang | ............... B62K 25/06 |
| 2006/0097471 A1 | 5/2006 | Van Den Brink et al. | |
| 2010/0007109 A1 | 1/2010 | Mighell | |
| 2014/0353940 A1 | 12/2014 | Bartolozzi et al. | |
| 2016/0272264 A1 | 9/2016 | Mogensen et al. | |
| 2023/0182850 A1 * | 6/2023 | Calderon | ............... B62K 5/01 |
| | | | 280/269 |

FOREIGN PATENT DOCUMENTS

| | | | |
|---|---|---|---|
| CN | 107097880 A | | 8/2017 |
| CN | 107416107 A | * | 12/2017 |
| CN | 107416107 A | | 12/2017 |
| EP | 2368729 A1 | | 9/2011 |
| GB | 2549917 A | | 11/2017 |

OTHER PUBLICATIONS

International Search Report dated May 12, 2021 for corresponding PCT Application No. PCT/IB2020/057692.

Written Opinion mailed dated May 12, 2021 for corresponding PCT Application No. PCT/IB2020/057692.

Communication, Supplementary Search Report and Search Opinion dated Oct. 24, 2023 issued in corresponding European Application No. 20949480.6.

Notification of First Office Action w/English translation dated Mar. 25, 2023 in corresponding Chinese Application No. 202080035201.9.

Notice of Grant w/English translation issued Dec. 16, 2023 in corresponding Chinese Application No. 202080035201.9.

* cited by examiner

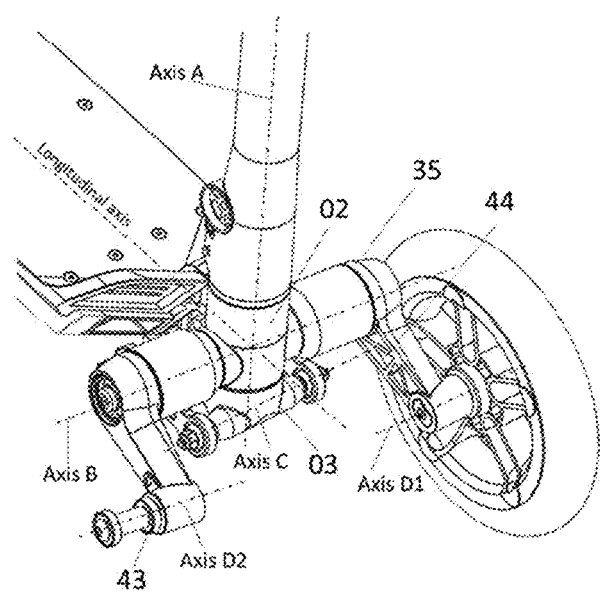 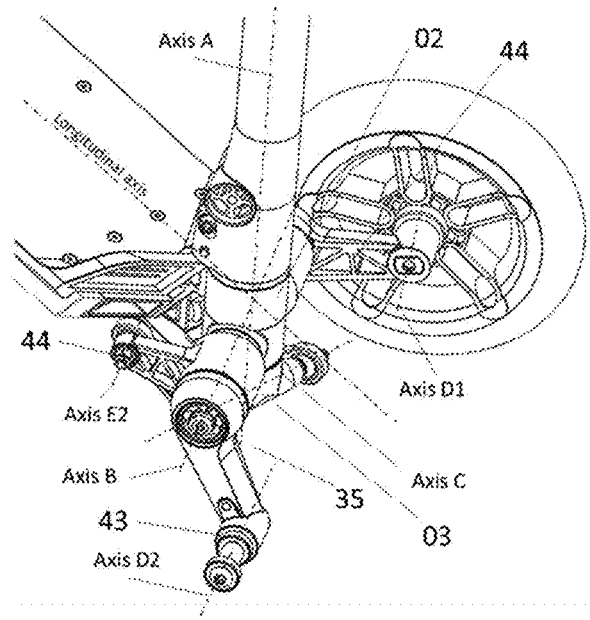
Figure 3(a)                                   Figure 3(b)
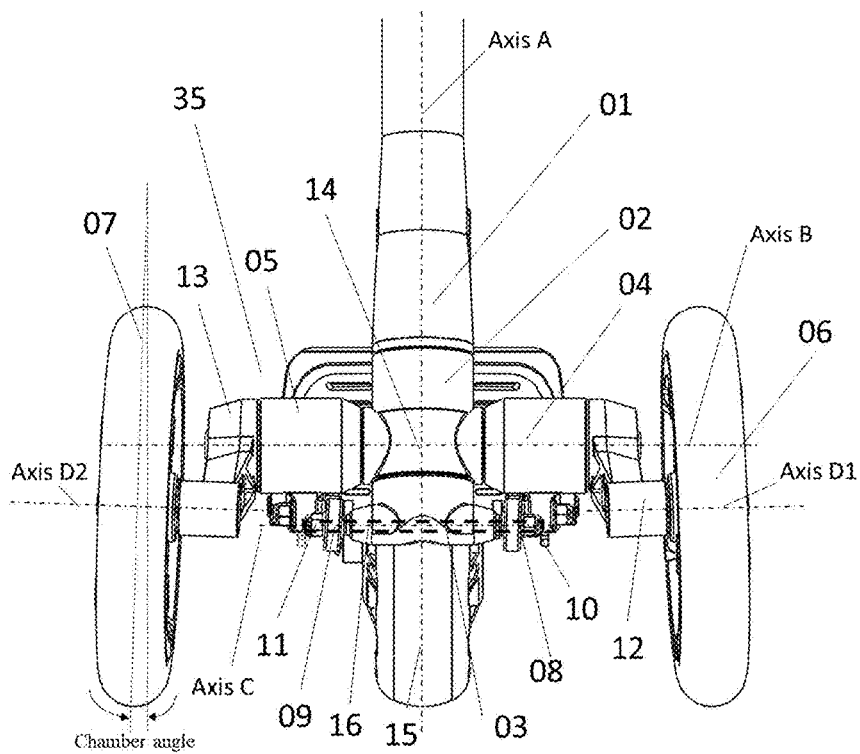
Figure 4

COUPLED STEERING TILTING AND EMBEDDED INDEPENDENT SUSPENSION SWING ARM SYSTEM FOR MULTI-WHEELED PERSONAL MOBILITY VEHICLES

FIELD OF THE INVENTION

This invention relates to multiple wheeled personal mobility vehicles. Particularly, for example, but not limited to, a three-wheeled trike configuration with coupled tilting steering and embedded independent suspension systems that offer the steering, lateral stability, and suspension characteristics of multiple wheeled vehicles and cars, and tilting characteristics of two in-line wheel vehicles, bicycles and scooters during turns while delivering an aesthetic appearance.

BACKGROUND

During turning, vehicles with more than two wheels, such as cars, suffer body roll that negatively affects tyre traction, comfort, and lateral stability due to centrifugal and inertia forces. On the other hand, two in-line wheeled vehicles such as motorcycles, scooters and bicycles require the rider to lean and tilt in order for the vehicle adequately to turn. The leaning of the rider and tilting of the vehicle counteracts the centrifugal moment created on the rider and the vehicle during a turn to balance the vehicle and introduces the centripetal force that makes turning possible during ride. The leaning and tilting of the rider and the vehicle add greater comfort, better tyre traction and better lateral manoeuvrability characteristics on tiltable vehicles compared to non-tilting multiple wheeled vehicles.

However, two-wheeled in-line vehicles are not self-stable in the lateral direction—the rider is required to maintain lateral balance of the vehicle at all time during ride. In times of emergency or where rapid reaction is required, changing the lean position to change the lateral direction can be difficult even for experienced riders. Furthermore, two in-line wheeled vehicles having one front tire limits the amount of braking, amount of deceleration that can be achieved.

Three-wheeled vehicles are the most energy efficient self-stable vehicles. Three wheeled vehicles in delta configuration (one front wheel and two rear wheels configuration) rolls over easily especially during accelerated and decelerated turns. The trike configuration which consists of two front wheels and one rear wheel can substantially overcome these said inherent deficiencies in two in-line wheels and delta configuration three-wheel vehicles. However, traditional designs of three wheeled vehicles cannot lean during turns like those of two in-line wheel vehicles.

In recent times, efforts to developed tiltable vehicles that i more than two in-line wheels have been made. One example of such effort include: U.S. Pat. No. 7,967,306 B2, Tilting Wheeled Vehicle; U.S. Pat. No. 7,591,337 B2, Leaning suspension mechanics; and U.S. Published Application No. 20140353940A1, Tilting motorcycles with two front steering wheels, are tilting wheeled vehicle designs that appear better suited to higher end motor vehicles and motorcycles rather than lightweight efficient personal mobility vehicles and devices. In the lightweight personal mobility vehicles and devices category, no one has been able to develop one system that enables tilting, suspension and steering to be performed at the same time while using simple mechanical linkages and achieving an aesthetic look. One example of such design is described in "Tilting mechanism for wheeled vehicles", U.S. Published Application No. 20160272264. In this design, the tilting mechanism is constructed from multiple tubular linkages or suspension arms and require external suspension struts to be operable. Such design lacks appeal due to their trusses and struts type design. Other designs include: "U.S. Pat. No. 7,073,806 B2, 3-wheel rolling vehicle with front 2-wheel steering; U.S. Pat. No. 7,543,829 B1, Three-wheel coaster Cycle; and U.S. Published Application No. 200697471A1, Tilting vehicle, which are largely similar. In general, these known tilting three-wheeled vehicles are said to be limited by the combination of not allowing adequate tilt, shock absorption and steering of the vehicle. Some reviewers also suggest that these existing designs require excessive user interaction to operate effectively.

A breakthrough was made by BMW's street carver skateboard, which has a steering tilting system that was designed by Designworks USA. However, this steering tilting system does not contain a suspension system. The award-winning BMW street carver has a striking appearance and steering tilting mechanism that gave it the ability to carve like a snowboard. A patent on its design is not known.

Therefore, a complex tilting, suspension and steering structure and mechanism is needed to overcome the above-noted inadequacies and is suitable for steerable lightweight personal mobility vehicles.

SUMMARY OF THE INVENTION

A coupled steering tilting and embedded independent shock absorption swing arm system abbreviated herein as the STS system of a personal mobility vehicle, for example, but not limited to, a three-wheeled trike configuration, is disclosed.

The coupled steering tilting and embedded independent suspension swing arm system, or the STS system, is applicable to personal mobility vehicles having more than two in-line wheels, in particularly but not limited to three wheeled trike configuration, which includes two front wheels and one rear wheel. The STS system includes (i.e., comprises) a mechanical system that replaces the front wheel of traditional two in-line wheeled vehicle such as those on motorcycle, scooter, and bicycle. Each front wheel is rotatably mounted to a swing arm system. A left swing arm system and a right swing arm system are pivotably mounted to the main axle of the cruciform assembly, which is pivotally connected to the chassis at the head tube system along the longitudinal centreline. The cruciform of the STS system is directly connected to the steering elements of the vehicle. The coupled steering tilting linkage system and embedded independent suspension swing arm system are independent systems that can be employed separately. Each swing arm system can be constructed with or without a suspension module that provide independent suspension function or no suspension, respectively, to each front wheel. The swing arms are linked to each other through a linkage system to enable coupled steering and tilting functions that offers the steering, lateral stability and suspension characteristics of multiple wheeled vehicles and tilting characteristics of two in-line wheel vehicles during turns.

Unlike two in-line wheeled vehicles, multiple wheeled vehicles are self-stable vehicles. The leaning and tilting characteristics allow centripetal force to help the vehicle better turn and allow the centrifugal force on the vehicle and rider during turning to be counteracted to provide increase stability, comfort, and safety. The disclosed coupled steering tilting embedded independent suspension (STS) system is a mechanical system, operated with simple linkages. The response is therefore direct without output manipulations and delays such as those experienced in electronic or electrical type systems.

The disclosed coupled steering tilting and embedded independent suspension swing arm system has a minimalistic appearance in that it does not involve complicated linkages, without numerous strut tubing, nor exposed external shock absorbers. The disclosed STS system uses carefully designed geometric arrangement and embedded torsion rubber shock absorbing system to delivering an aesthetic appearance that is unlike any other existing vehicle tilting mechanisms.

BRIEF DESCRIPTION OF THE DRAWINGS

The drawings of the coupled steering tilting and embedded independent suspension swing arm mechanisms are presented from FIG. 1 to FIG. 10(b). The part names and part IDs referenced to in these drawings are summarized in Table 1.

FIG. 3(a) shows a steering tilting suspension mechanism, with RHS front wheel removed, in the upright position, in accordance with various embodiments of the presently disclosed subject matter.

FIG. 3(b) shows the steering tilting suspension mechanism of FIG. 3(a), with RHS front wheel removed, in the left turn tilted position, in accordance with various embodiments of the presently disclosed subject matter.

FIG. 4 is a front view of the three wheeled personal mobility vehicles focused on the front wheels and the coupled steering tilting and embedded independent suspension swing arm system, in accordance with various embodiments of the presently disclosed subject matter.

DETAILED DESCRIPTION

Figure 1:
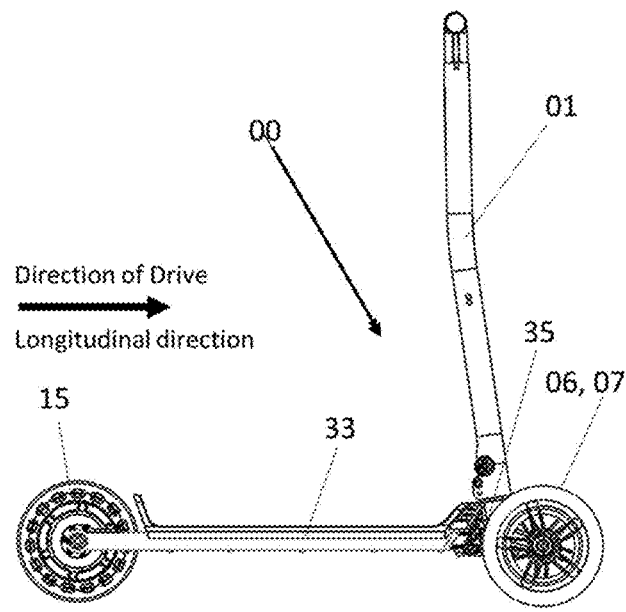
FIG. 1 shows a side view of a three-wheeled personal mobility vehicle in a trike configuration, in accordance with various embodiments of the presently disclosed subject matter.

The embodiments of FIG. 1 to FIG. 10(b) disclose an invention for a tilting three-wheeled trike vehicle 00 according to the invention. The basic vehicle 00 comprised of the following major components: a chassis 33, one left front wheel 06, one right front wheel 07, the coupled steering tilting independent suspension swing arm system 35, a rear wheel 15, and a steering down tube 01 with a handlebar or steering wheel means.

The embodiment of FIG. 1 shows a unique coupled swingable rotatable and shock absorbing system 35 for a pair of spaced-apart front wheels 06, 07 operably secured thereto with the STS system 35. The STS system 35 extending between the front wheels 06, 07 is pivotally secured to the chassis 33 of the vehicle 00 at the upper head tube 02 and lower head tube fitting 03, which is rigidly secured to the chassis 35.

Figures 2A, 2B:
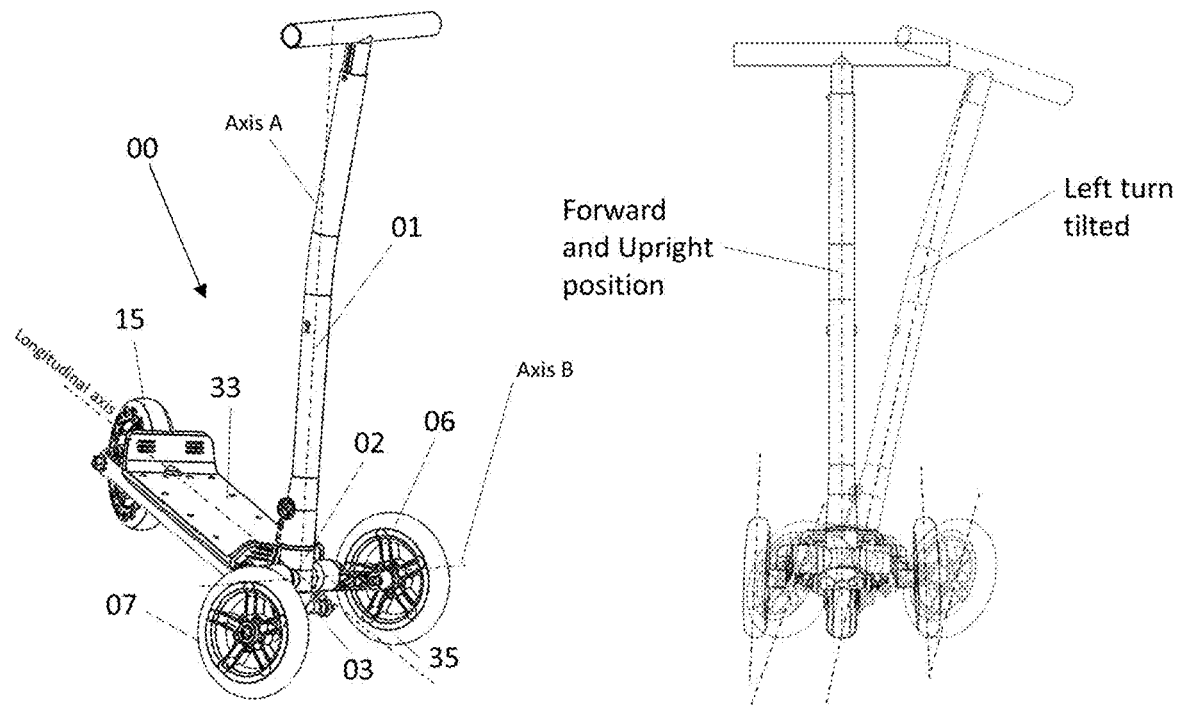
FIG. 2(a) is an isometric view of the coupled steering tilting three wheeled personal mobility vehicle in trike configuration of FIG. 1 shown in a slightly tilted turn position, in accordance with various embodiments of the presently disclosed subject matter.
FIG. 2(b) shows an overlap illustration of the vehicle in the upright and tilted turn positions, in accordance with various embodiments of the presently disclosed subject matter.

FIG. 2(a) of the embodiment is an isometric view of the vehicle 00 in FIG. 1 in a slightly tilted turn position. It shows the vehicle 00 replaces the front wheel of a traditional two-wheeled in-line personal mobility vehicle with a pair of front wheels 06, 07 joined to the vehicle 00 at a pair of swing arms 12, 13, that is a part of the STS system 35. The design allows the front wheels 06, 07 to pivot relative to the Axis A and swing relative to the Axis B to develop a coupled steering and tilting action. FIG. 2(b) shows an overlap view and comparison of the upright and tilted turn positions of the vehicle that demonstrates the steering, lateral stability and suspension characteristics similar to multiple wheeled vehicles and cars, and tilting characteristics similar to two in-line wheel vehicles, bicycles and scooters during turns. FIG. 2(b) shows the vehicle in its tilted turning position, all three wheels 06, 07, 15 become tilted towards to direction of the turn. Tilted wheel introduces centripetal force to assist turning plus the benefits of allowing the tyre to create greater contact with the road under turning conditions, reduces the lateral force and bending moment on the wheel.

In the embodiment of FIG. 3, the right-hand side front wheel is hidden from the illustrations to provide a clearer, unobstructed view of the STS system 35. FIG. 3 shows the right wheel hub includes a bushing 43, which protects and strengthens a machined bore hole. The embodiment of FIG. 4 is a front view of the vehicle 00 focused on the front wheels 06, 07 and the STS system 35. FIG. 3 and FIG. 4 show the overall arrangement, relationships, and assembly of the STS system 35 with the chassis 33. The upper head tube 02, which is rigidly connected to the neck frame, and lower head tube fitting 03, are rigidly mounted to the chassis 33. Tilting of the upper head tube 02 and lower head tube fitting 03 causes the chassis and the rear wheel 15 to tilt as one.

The cruciform assembly 14 is a part of the STS system 35. The steerer tube 31 of the cruciform assembly 14 is pivotally connected through machined bore holes on the upper head tube 02 and lower head tube fitting 03, with the cruciform assembly 14 sandwiched in between the upper head tube 02 and lower head tube fitting 03 and aligning with the machined bore holes along Axis A. A bearing system is employed as the mediator between the steerer tube 31 of the cruciform 14 and the upper head tube 02 and lower head tube fitting 03 to allow free rotation of the cruciform assembly 14, and hence the STS system 35 about the Axis A. FIG. 3 shows the rotation of the STS system 35 about Axis A.

The steering down tube is connected to the handlebar or steering wheel means at the other end, allows the rotation of the cruciform assembly to be controlled manually and freely about the Axis A. The steering down tube 01 is rigidly connected to the remaining protruding section of the steerer tube 31 of the cruciform assembly 14 and over the top of the bearing system and the machined bore hole of the upper head tube 02 using a clamping system.

Figure 6:
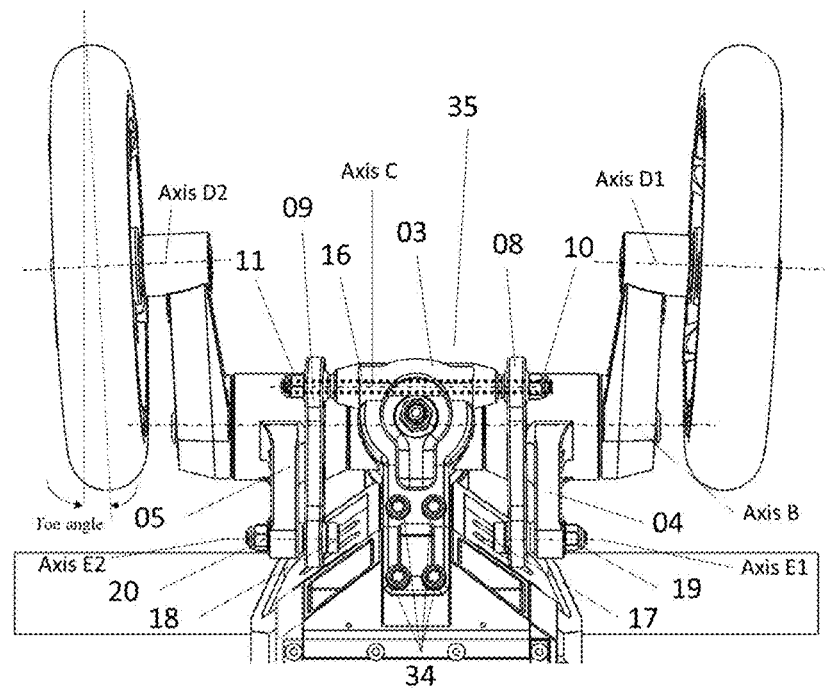
FIG. 6 is an underside view of a three wheeled personal mobility vehicle, focused on the front wheels and the coupled steering tilting and embedded independent suspension swing arm system, in accordance with various embodiments of the presently disclosed subject matter.

FIG. 4 and FIG. 6 show that the left and right swing arms 12, 13 have built-in toe angle and chamber angle at the front wheel hub of the front wheel connections. Tow angle and chamber angle enhance turning performance, reduce lateral force, bending moment, and reduce scrub on the front wheels.

Figure 5:
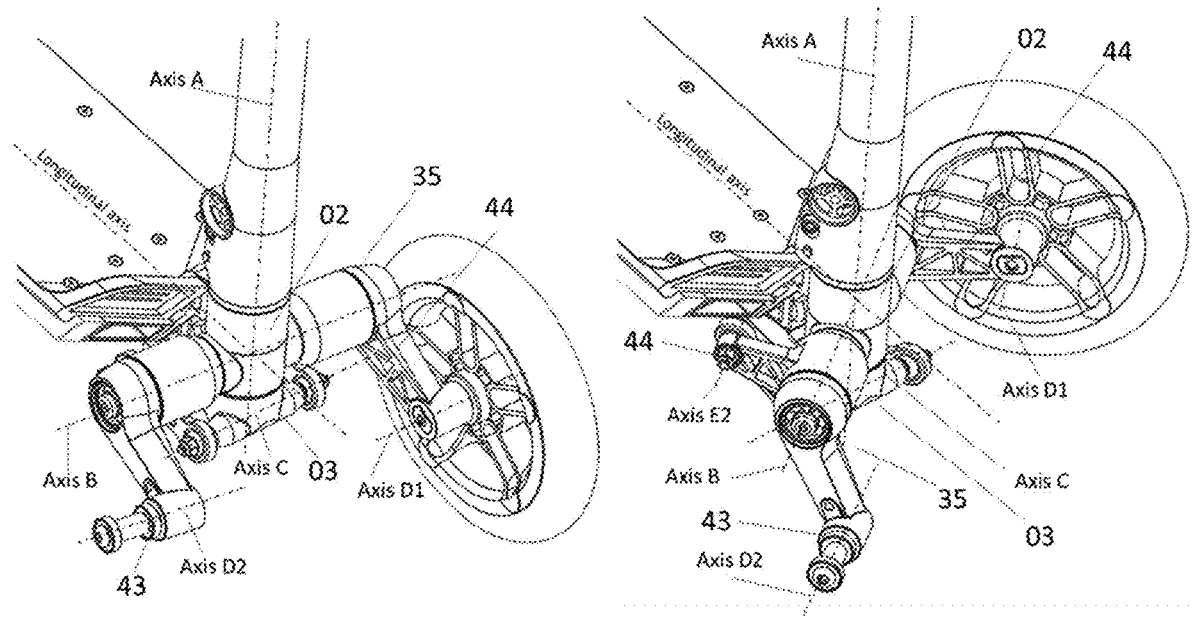
FIG. 5 shows a cruciform assembly, in accordance with various embodiments of the presently disclosed subject matter.

FIG. 5 is an illustration of the cruciform assembly 14. The assembly includes of the main axle 30, the steerer tube 31, and the cruciform housing 32. The main axle 30 aligns with the Axis B and the steerer tube 31 aligns with Axis A, where Axis A and Axis B are perpendicular to each other. Both the main axle 30 and the steerer tube 31 are rigidly fitting into the cruciform housing 32. Lightening, i.e., weight reducing, holes and webs 44 are designed into the cruciform housing to reduce mass.

In FIG. 3 and FIG. 4 the lower head tube fitting is secured to the chassis using four fasteners 34, which are best seen in FIG. 6. On the lower head tube fitting 03, at position along Axis B, it includes of the steering-tilting axle 16. The steering-tilting axle 16 is press-fitted or inserted with the moulding of the designated bore hole of the lower head tube fitting 03.

FIG. 3 and FIG. 4 show the left front wheel 06 is secured to the cruciform assembly 14 via the left swing arm assembly that comprised of the left swing arm 12 and left suspension module housing 04. The left suspension module housing 04 includes of a lug on the end of a lever arm that points and extends in the rearward direction of the vehicle 00. The left suspension module housing 04 and the left swing arm 12 are pivotally connected to the cruciform assembly 14 through the main axle 30 such that they are both rotatable about the Axis B. Lightening holes and webs 44 are designed into the swing arms (12 and 13) to reduce mass.

The lug on the left suspension module housing 04 is coupled with the steering-tilting axle 16 on the lower head tube fitting 03 via the left steering-tilting linkage 08. As shown in FIG. 6, the left steering-tilting linkages 08 in the invention passes underneath the left swing arm assembly to couple with the steering-tilting axle 16. This arrangement allows the left steering-tilting linkage 08 to become substantially out-of-sight, resulting in a clean-minimalistic appearance.

The lug on the left suspension housing 04 is pivotally connected to the left steering tilting linkage 08 via a shoulder bolt through Axis E1. The connection is secured using a lock nut 19. The left steering tilting linkage 08 is pivotally connected to the steering-tilting axle through Axis C. The connection is secured using a lock nut 10.

FIG. 3 and FIG. 4 also show the right front wheel 07 is secured to the cruciform assembly 14 through the right swing arm assembly that comprised of the right swing arm 13 and right suspension module housing 05. The right suspension module housing 05 includes of a lug on the end of a lever arm that points and extends in the rearward direction of the vehicle 00. The right suspension module housing 05 and the right swing arm 13 are pivotally connected to the cruciform assembly 14 through the main axle 30 such that they are both rotatable about the Axis B. Lightening holes and webs 44 are designed into the suspension module housing (05 and 04) to reduce mass.

The lug on the right suspension module housing 05 is coupled with the steering-tilting axle 16 on the lower head tube fitting 03 via the right steering-tilting linkage 09. As shown in FIG. 6, the right steering-tilting linkages 09 in the invention passes underneath the right swing arm assembly to couple with the steering-tilting axle 16. This arrangement allows the right steering-tilting linkage 09 to become substantially out-of-sight, resulting in a clean-appearance.

The lug on the right suspension housing 05 is connected to the right steering tilting linkage 09 via a shoulder bolt through Axis E1. The connection is secured using a lock nut 20. The right steering tilting linkage 09 is pivotally connected to the steering-tilting axle through Axis C. The connection is secured using a lock nut 11.

The left and right steering tilting linkages 08, 09 are identical components. The steering tilting linkages comprised of a tie rod body with tie rod ends at both ends. Tie rod ends are ball joint type bearing, for example, but not limited to, radial spherical plain bearings, are press-fitted into the lugs at both ends. Alternatively, rod ends can be used. The tie rod body may be fixed in length or designed to be adjustable in length.

FIG. 6 shows that the left steering tilting linkage 08 passes beneath the suspension module housing 04 and is pivotally connected to the lower head tube fitting 03 along Axis C through the steering-tilting axle 16.

FIG. 6 shows that the right steering tilting coupling 09 passes beneath the suspension module housing 05 and is pivotally connected to the lower head tube frame 03 along Axis C through the steering-tilting axle 16.

Figure 7:
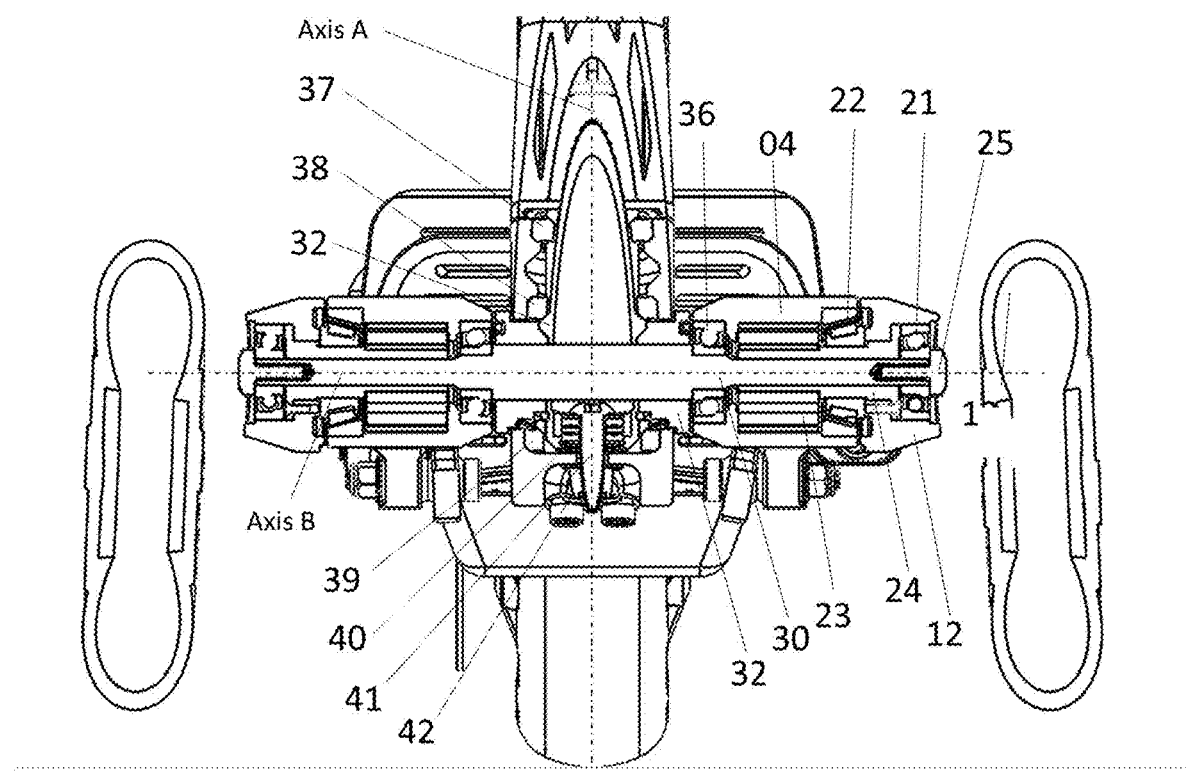
FIG. 7 shows a frontal, cross-sectional view of the vehicle in FIG. 6 along Axis B, in accordance with various embodiments of the presently disclosed subject matter.

The embodiment of FIG. 7 shows the frontal, cross-sectional view of the vehicle 00 cut along Axis B, which shows the cross-section of the STS system 35. The embodiment shows the STS system 35 is pivotally connected to the chassis 33 along Axis A between the upper head tube 02 and lower head tube fitting 03. The steerer tube 31 of the cruciform 14 aligns the STS system 35 with the upper head tube 02 bore hole and lower head tube fitting 03 bore hole indirectly via means of three headset bearings: two headset bearings 37, 38 fitted to the upper head tube 02 bore hole and one headset bearing 39 fitted to the lower head tube fitting. The bearing system includes of lubricant, rubber seals, and dust caps, which are applied to ensure smooth, water free and dust free rotation of the coupled steering tilting and embedded independent suspension system swing arm system 35 about Axis A. The cruciform 14 is further secured to the lower head tube fitting 03 along the direction of the Axis A using a thrust bearing 40, secured firmly together with a fastener 41, washers and a lock nut 42. The cruciform assembly and hence the STS system 35 is secured to the upper head tube along the direction of Axis A using the industrial standard Hidden Internal Compression (HIC) system, which is not shown in the diagrams.

The embodiment of FIG. 7 shows in detail that the left suspension housing 04 is rotatably mounted along Axis B to the cruciform 14 on the main axle using an angular contact bearing 36 and a taper roller bearing 22 such that all shear forces are transferred to the main axle 30. The right-hand side suspension housing 05 is also rotatably mounted along Axis B to the cruciform 14 on the main axle using an angular contact bearing and a taper roller bearing.

The embodiment of FIG. 7 shows that the left torsion rubber suspension module 23 is fitted inside the receptacle on the left suspension housing 04. The cross-section view of the left suspension housing and the left torsion rubber suspension module 23 is shown in FIG. 39(b). Similarly, the cross-sectional view of embodiment FIG. 7 also shows that the right torsion rubber suspension module is fitted inside the receptacle of the right suspension housing 04. The cup of the left taper roller bearing 22 is fitted to a receptacle on the left suspension module housing 04. The cup of the right taper roller bearing (not labelled in any embodiments) is also fitted to a receptacle on right suspension module housing 05.

Figure 8:
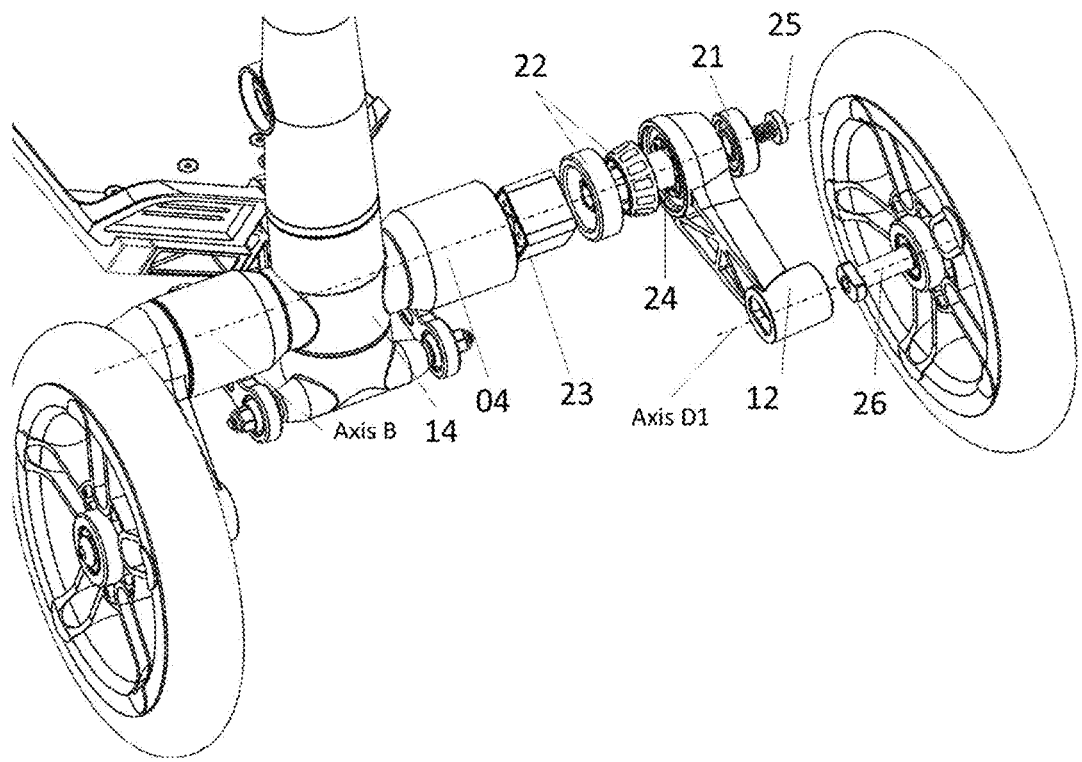
FIG. 8 shows an exploded view of the left swing arm and left-hand side, front wheel system, in accordance with various embodiments of the presently disclosed subject matter.

The embodiments of FIG. 8 to FIG. 10 shows the independent suspension swing arm system of the STS system 35. A torque shaft 24 has four segments (which is not clearly shown in any embodiments): Segment one is a flange located at one end, segment two is a square shape section, segment three is a circular section and segment four at the other end is also a square section. The torque shaft 24 has a circular hollow centre through the entire shaft. In one disclosed embodiment best shown in FIG. 8, the torque shaft 24 is fitted into a square shaped receptacle and securely fastened using countersink fasteners at the flange to a pivot hole of left swing arm 12 along the Axis B, and then followed by the installation of an angular contact ball bearing 21 into the receptacle in the left swing arm 12. The identical configuration but opposite construction and assembly applies to the right swing arm 13.

The protruding section of the torque shaft 24 has two distinct sections: A circular section 24(a) and a squared section 24(b). A cone of the taper roller bearing 22 is fitted over the circular section of the torque shaft. The square section of the torque shaft 24 is fitted into the hollow of the inner casing of the suspension module 29. The same principle applies to both left-hand and right-hand sides.

The torque shaft 24 of the left swing arm assembly is then installed over the main axle 30 and into the left suspension module inner casing 29. The swing arm is lastly fastened to the main axle using a fastener 25. A correct torque is applied to the fastener to ensure a correct compression is applied to the swing arm system: not over tightened nor under tightened. The design and construction allow the left swing arms 12 to independently pivot about the main axle 30, and hence Axis B, and the swing arm can rotate to deform the suspension module 23. An identical principle but opposite construction and assembly applies to the right swing arm assembly.

Figure 9A:
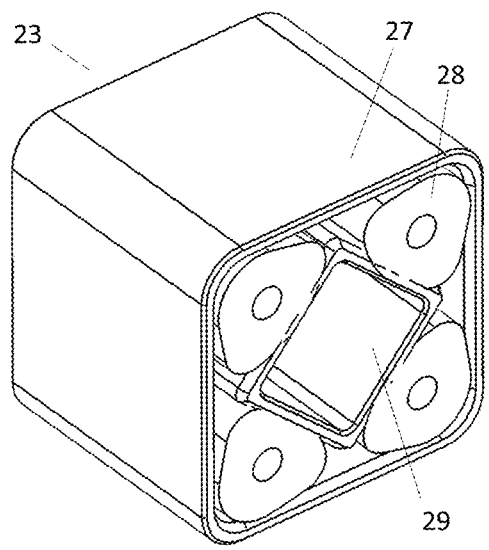
FIG. 9(a) shows the torsion rubber suspension module, in accordance with various embodiments of the presently disclosed subject matter

In the embodiment of FIG. 9, the principle of the torsion rubber suspension module according to the invention is shown. FIG. 9(a) shows the torsion rubber suspension module 23. The same module applies to both the left and right sides. Since all rubber and polymer materials suffer compression set over time, the torsion rubber suspension module is a self-contained module, which is designed for replacement. The self-contained torsion rubber suspension module 23 enables ease of service, maintenance, upgrade, and replacement.

As shown in FIG. 9(a) of the embodiment, the torsion rubber suspension module includes of a hollow outer casing 27, a hollow square inner casing 29 and rubber rods 28. The elastic rubber rods 28 are installed between the outer casing 27 and inner casing 29 in a manner shown in FIG. 9(a). The installation puts the rubber rods 28 in pre-compressive loading. The cross-sectional shape of the rubber rods 28 can be designed into various shapes to match, vary or optimise suspension stiffness, better distribute the compressive loading on the rubber rods, and improve heat transfer. The rubber rods 28 may or may not contain a hollow as shown. The size of the hollow, if present, in the rubber rods 28 are designed for altering suspension stiffness and improve cooling via air conduction.

Figure 9B:
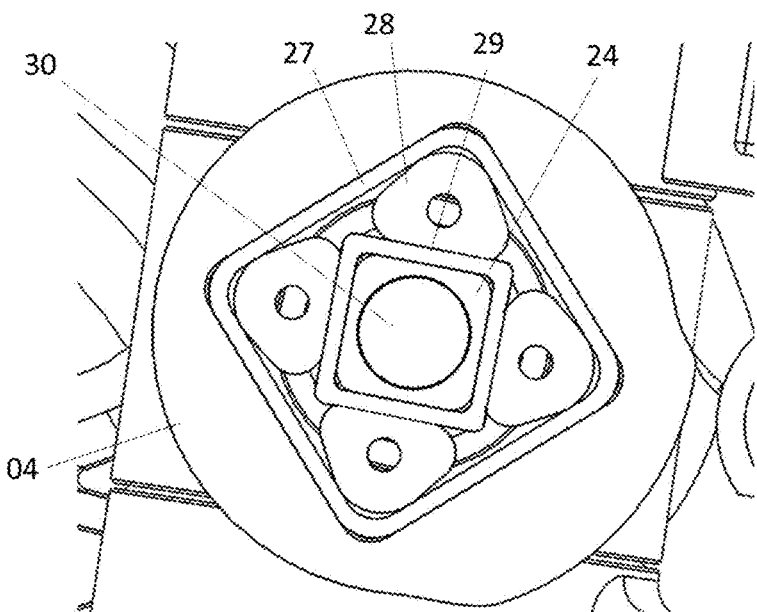
FIG. 9(b) shows a cross-sectional view of the left swing arm system assembly, in accordance with various embodiments of the presently disclosed subject matter
Figures 10A, 10B:
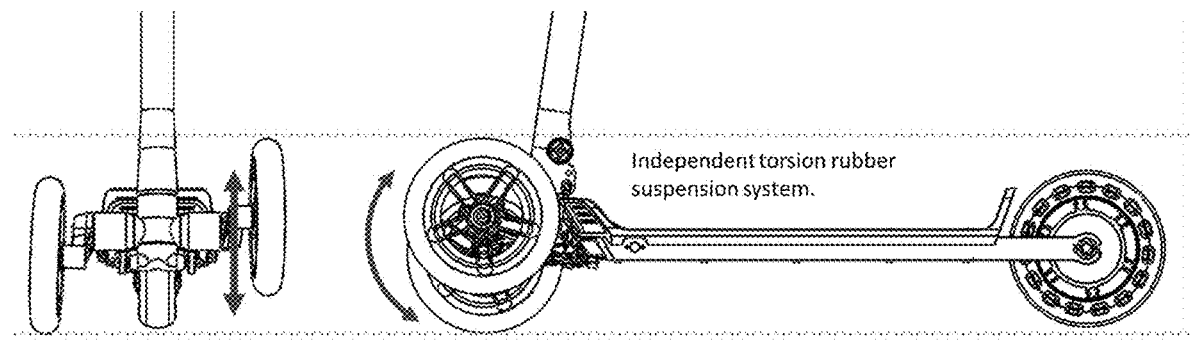
FIG. 10(a) shows a front view of the independent suspension movement of the left swing arm and left front wheel, in accordance with various embodiments of the presently disclosed subject matter.
FIG. 10(b) shows a side view of the independent suspension movement of the left swing arm and left front wheel, in accordance with various embodiments of the presently disclosed subject matter.

The cross-sectional view of the assembled left-hand side suspension swing arm system is shown in the embodiment of FIG. 9(b). The outer casing of the suspension module 27 is installed into the receptacle of the suspension module housing 04. The torque shaft 24 at one end has a square external shape and a circular hollow centre through the entire shaft. With reference to the embodiment of FIG. 7 thru FIG. 9(a), the hollow circular centre allows the main axle 30 of the cruciform assembly 14 to closely run through, while the square end of the torque shaft 24 fits closely and firmly into the hollow inner casing of the torsion rubber suspension module 29. Considering the left-hand side, since the torque shaft 24 is rigidly fixed to the left swing arm 12, when a torque is applied to the swing arm 12, the swing arm 12 and the torque shaft 24 rotate about the main axle. This leads to the inner casing of the suspension module 29 to rotate with the torque shaft 24, causing a change in the cavities between the outer casing 27 and inner casing 29. Changing the shape of the cavity between the outer casing 27 and inner casing 29 induces elastic deformation and compression in the rubber rods 28. As the rubber rods 28 compress, they act to absorb and dampen the torsional energy and transform the energy into elastic deformation and heat. Once the torque on the left swing arm 12 is removed, the elastic deformation of the rubber rods 28 is alleviated and returns to the equilibrium position. Heat energy on the rubber rod 28 is transfer to outer casing 27 and inner casing 29, which is cooled by conduction. The same said operating and shock absorption principles applied to both the left-hand and right-hand sides.

The embodiment includes a coupled independent torsion rubber suspension swing arm system 23 as a part of the invention. However, because the coupled steering-tilting system 35 does not depend on the independent torsion rubber suspension swing arm system 23 to be operable. The disclosed coupled steering-tilting suspension swing arm system 23 can be made without a suspension function if desired. The disclosed coupled steering-tilting suspension swing arm system 23 thus reduces to a coupled steering-tilting swing arm system. In this said case, the coupled torsion rubber suspension systems 23, the torque shaft 24, and the tapered roller bearing 22 are omitted, and the left and right suspension module housing 04, 05 and the left and right swing arm 12, 13 are constructed as a rigid components.

Fastener adhesive can be applied to threaded fasteners to prevent loosening.

The disclosed STS system 35 is a simple design that involves simple linkages. The disclosed STS system delivers a clean and aesthetic vehicle tilting system for steerable three-wheeled trike configuration personal mobility vehicles unlike any before.

TABLE 1

Part name and part IDs found in FIG. 1 to FIG. 10(b).

| Part ID | Part name |
|---|---|
| 00 | Tilting three-wheeled vehicle in trike configuration |
| 01 | Steering down tube |
| 02 | Upper head tube |
| 03 | Lower head tube fitting |
| 04 | Left Suspension module housing |
| 05 | Right Suspension module housing |
| 06 | Left front wheel |
| 07 | Right front wheel |
| 08 | Left Steering Tilting linkage |
| 09 | Right Steering Tilting linkage |
| 10 | Left lock nut |
| 11 | Right lock nut |
| 12 | Left swing arm |
| 13 | Right swing arm |
| 14 | Cruciform assembly |
| 15 | Rear wheel/hub motor |
| 16 | Steering-tilting axle |
| 17 | Left Fastener |
| 18 | Right Fastener |
| 19 | Lock nut |
| 20 | Lock nut |
| 21 | Angular contact ball bearing |
| 22 | Tapered Roller bearing cone and cup |
| 23 | Torsion rubber suspension module |
| 24 | Torsion shaft |
| 25 | Screw |
| 26 | LHS Front wheel axle |
| 27 | Suspension module outer casting |
| 28 | Rubber |
| 29 | Suspension module Inner casing |
| 30 | Main axle |
| 31 | Steerer compression tube |
| 32 | Cruciform housing |
| 33 | Chassis |
| 34 | Fastener |
| 35 | STS system |
| 36 | Angular contact ball bearing |
| 37 | Headset bearing |
| 38 | Headset bearing |
| 39 | Headset bearing |
| 40 | Thrust bearing |
| 41 | Fastener |
| 42 | Lock nut |
| 43 | Bushing |
| 44 | Lightening holes and web stiffeners |

A personal mobility vehicle including: a chassis; a rear wheel rotatably connected to a rear end of the chassis; a coupled steering tilting and embedded independent shock absorbing swing arm system rotationally and centrally connected to a front end of the chassis along a longitudinal axis of the chassis, a steering down tube assembly connected at a bottom end to a top of the coupled steering tilting and embedded independent shock absorbing swing arm system, which is aligned with and perpendicular to the longitudinal axis of the chassis; a handle bar connected at a top end of the steering down tube assembly; a left front wheel rotatably connected to a left side of the coupled steering tilting and embedded independent shock absorbing swing arm system; and a right front wheel rotatably connected to a right side of the coupled steering tilting and embedded independent shock absorbing swing arm system.

The personal mobility vehicle wherein the coupled tilting steering and embedded independent shock absorbing swing arm system extends between the left front wheel and the right front wheel and is pivotally secured to the chassis of the vehicle between the upper head tube and a lower head tube fitting.

The personal mobility vehicle further includes: a motor affixed to the rear end of the chassis and operatively connected to the rear wheel to propel the personal mobility vehicle.

The personal mobility vehicle wherein the coupled tilting steering and embedded independent shock absorbing swing arm system includes: a pair of independent suspension swing arm systems, including a left swing arm connected between the coupled tilting steering and embedded independent shock absorbing swing arm system and the left front wheel, and a right swing arm connected between the coupled tilting steering and embedded independent shock absorbing swing arm system and the right front wheel.

The personal mobility vehicle wherein a coupled steering-tilting embedded independent shock absorbing swing arm system includes: a left independent suspension swing arm system and a right independent suspension swing arm system, which are operable independently of each other.

The personal mobility vehicle wherein the upper head tube includes: an upper head tube machined bore hole and neck frame that is rigidly fixed to the chassis and aligned along the personal mobility vehicle's longitudinal axis; the lower head tube fitting includes a lower head tube fitting machined bore hole and a steering tilting axle and is rigidly connected to the chassis using fasteners; and the lower head tube fitting is aligned with the personal mobility vehicle's longitudinal axis.

The personal mobility vehicle wherein the coupled tilting steering and embedded independent shock absorbing swing arm system includes: a left swing arm system including: a left suspension module housing assembly including a left suspension module housing with a left lever arm that contains a lug at the end, a left torsion rubber suspension module, a left angular contact bearing and a cup of a left taper roller bearing fitted into respective left receptacles, and the lever arm extends toward the rear end of the chassis, and a left swing arm assembly comprised of a left swing arm, a left torque shaft, left countersink fasteners and a left angular contact ball bearing, the left swing arm has a left pivot joint at one end and a left wheel hub at the other end, the left torque shaft, the left countersink fasteners and the left angular contact ball bearing are fitted into a left receptacle at the left pivot joint, and the left wheel hub of the left front wheel is pivotally connected to the left swing arm via a left wheel axle; a right swing arm system includes: a right suspension module housing assembly including a right suspension module housing with a right lever arm that contains a right lug at the end, a right torsion rubber suspension module, a right angular contact bearing and a cup of a right taper roller bearing fitted into respective right receptacles, and the lever arm extends toward the rear end of the chassis, and a right swing arm assembly comprised of a right swing arm, a right torque shaft, the cone of the taper roller bearing fitted over the torque shaft, right countersink fasteners and a right angular contact ball bearing, the right swing arm has a right pivot joint at one end and a right wheel hub at the other end, the right torque shaft, the right countersink fasteners and the right angular contact ball bearing are fitted into a right receptacle at the right pivot joint, and the right wheel hub of the right front wheel is pivotally connected to the right swing arm via a right wheel axle; a cruciform assembly including: a steerer tube that allows the coupled tilting steering and embedded independent shock absorbing swing arm system to pivot about an Axis A, a main axle wherein the left swing arm assembly and right swing arm assembly are fitted to allow the left swing arm assembly and right swing arm assembly to swing about the main axle, the main axle is aligned with an Axis B, and a cruciform housing that fixes the steerer tube and the main axle in a perpendicular fashion; a left steering-tilting linkage including: a tie rod body and ball joint type bearings at each end, the left steering-tilting linkage is pivotally connected at one end to the lug of the left suspension module housing assembly, and at the other end is pivotally connected to the left side of the steering-tilting axle of the lower head tube fitting; and a right steering-tilting linkage including: a tie rod body and ball joint type bearings at each end, the right steering-tilting linkage is pivotally connected at one end to the lug of the right suspension module housing assembly, and the other end is pivotally connected to the right side of the steering-tilting axle of the lower head tube fitting; wherein the steering down tube is rigidly connected to a protruding section of the steerer tube of the cruciform assembly over the top of the upper head tube and an industrial standard hidden internal compression (HIC) system using a clamping system.

The personal mobility vehicle wherein the left wheel hub includes a built-in toe angle and a chamber angle, and the machined bore hole is protected with a bushing.

The personal mobility vehicle wherein the right wheel hub includes a built-in toe angle and a chamber angle, and the machined bore hole is protected with a bushing.

The personal mobility vehicle wherein the left torque shaft and the right torque shaft each include four segments: a segment one is a flange at one end, a segment two is a square shape section, a segment three is a circular section and a segment four at the other end is a square section; a circular hollow centre formed through an entire length of each of the left torque shaft and the right torque shaft; and each of the left torque shaft and the right torque shaft, respectively, is fitted into a square shaped receptacle and securely fastened with countersink fasteners at the flange to a pivot hole of the left swing arm and a pivot hole of the right swing arm.

The personal mobility vehicle wherein the cruciform assembly is sandwiched between the upper head tube and the lower head tube fitting, and the steerer tube is pivotally secured using a headset bearing system and the industrial standard hidden internal compression (HIC) system.

The personal mobility vehicle wherein the headset bearing system is comprised of three headset bearings: two headset bearings fitted to the upper head tube machined bore hole and one headset bearing fitted to the lower head tube fitting, the bearing system includes a lubricant, a plurality of rubber seals, and a plurality of dust caps, which are applied to ensure smooth, water free and dust free rotation of the cruciform assembly and hence the coupled steering, a tilting and suspension system swing arm about the Axis A, the cruciform assembly is further secured to the lower head tube fitting along the direction of the Axis A using a thrust bearing secured firmly together with a fastener, a plurality of washers, and a lock nut.

The personal mobility vehicle wherein the tie rod body may be fixed in length or adjustable in length to enable altering a ground clearance of the personal mobility vehicle.

The personal mobility vehicle wherein the coupled tilting steering and embedded independent shock absorbing swing arm system is to a coupled tilting steering swing arm system without a suspension function.

The personal mobility vehicle wherein the coupled tilting steering swing arm includes: a rigid left suspension module housing swing arm system without a left torsion rubber suspension module, a left torque shaft, a left countersink fasteners, and a left tapered roller bearing; and a rigid right suspension module housing swing arm system without a right torsion rubber suspension module, a right torque shaft, a plurality of right countersink fasteners, and a right tapered roller bearing.

The personal mobility vehicle wherein the coupled tilting steering and embedded independent suspension swing arm system is symmetrical about the Axis A.

The personal mobility vehicle further including: a lower head tube fitting comprised of a steering-tilting axle located below the cruciform assembly.

The personal mobility vehicle wherein lugs on the left and right suspension module housings are connected to respective left and right steering tilting linkages via shoulder bolts and are secured using lock nuts, and the left and right steering tilting linkage is pivotally connected to the steering-tilting axle and secured using lock nuts.

The personal mobility vehicle wherein a left and a right embedded torsion rubber suspension module each includes a plurality of torsion rubber rods around a square inner casing and the left and right embedded torsion rubber suspension modules are inserted into the left and right suspension module housings, respectively.

The personal mobility vehicle wherein a plurality of lightening holes and webs are formed in the swing arms, the cruciform housing, and the suspension module housings.

In view of the variety of embodiments to which the principles of the invention can be applied, it should be apparent that the detailed embodiments are illustrative only and should not be taken as limiting the scope of the invention. The claims invention includes all such modifications as may come within the scope of the claims and equivalent thereto.

What is claimed is:

1. A personal mobility vehicle comprising:
    a chassis;
    a rear wheel rotatably connected to a rear end of the chassis;
    a coupled tilting steering and embedded independent shock absorbing swing arm system rotationally and centrally connected to a front end of the chassis along a longitudinal axis of the chassis, a steering down tube assembly connected at a bottom end to a top of the coupled tilting steering and embedded independent shock absorbing swing arm system, which is aligned with and perpendicular to the longitudinal axis of the chassis, and the coupled tilting steering and embedded independent shock absorbing swing arm system extends between a left front wheel and a right front wheel and is pivotally secured to the chassis of the personal mobility vehicle between an upper head tube and a lower head tube fitting, the upper head tube includes an upper head tube machined bore hole and neck frame that is rigidly fixed to the chassis and aligned along a longitudinal axis of the personal mobility vehicle; the lower head tube fitting is comprised of a lower head tube fitting machined bore hole and a steering tilting axle and is rigidly connected to the chassis using fasteners; and the lower head tube fitting is aligned with the longitudinal axis of the personal mobility vehicle;
    a handle bar connected at a top end of the steering down tube assembly;
    the left front wheel rotatably connected to a left side of the coupled steering tilting and embedded independent shock absorbing swing arm system; and the right front wheel rotatably connected to a right side of the coupled steering tilting and embedded independent shock absorbing swing arm system.

2. The personal mobility vehicle of claim 1 further comprising:
a motor affixed to the rear end of the chassis and operatively connected to the rear wheel to propel the personal mobility vehicle.

3. The personal mobility vehicle of claim 1 wherein the coupled tilting steering and embedded independent shock absorbing swing arm system comprises: a pair of independent suspension swing arm systems, including a left swing arm connected between the coupled tilting steering and embedded independent shock absorbing swing arm system and the left front wheel, and a right swing arm connected between the coupled tilting steering and embedded independent shock absorbing swing arm system and the right front wheel.

4. The personal mobility vehicle of claim 1 wherein the coupled tilting steering and embedded independent shock absorbing swing arm system comprises: a left independent suspension swing arm system and a right independent suspension swing arm system, which are operable independently of each other.

5. The personal mobility vehicle of claim 1 wherein the coupled tilting steering and embedded independent shock absorbing swing arm system comprises:
a left swing arm system comprised of:
a left suspension module housing assembly comprised of a left suspension module housing with a left lever arm that contains a lug at an end, a left torsion rubber suspension module, a left angular contact bearing and a left cup of a left taper roller bearing fitted into respective left receptacles, and the left lever arm extends toward the rear end of the chassis; and
a left swing arm assembly comprised of a left swing arm, a left torque shaft, a left cone of the left taper roller bearing fitted over the left torque shaft, left countersink fasteners and a left angular contact ball bearing, the left swing arm has a left pivot joint at one end and a left wheel hub at the other end, the left torque shaft, the left countersink fasteners and the left angular contact ball bearing are fitted into a left receptacle at the left pivot joint, and the left wheel hub of the left front wheel is pivotally connected to the left swing arm via a left wheel axle;
a right swing arm system comprised of:
a right suspension module housing assembly comprised of a right suspension module housing with a right lever arm that contains a right lug at the end, a right torsion rubber suspension module, a right angular contact bearing and a right cup of a right taper roller bearing fitted into respective right receptacles; and the right lever arm extends toward the rear end of the chassis; and
a right swing arm assembly comprised of a right swing arm, a right torque shaft, a right cone of the right taper roller bearing fitted over the right torque shaft, right countersink fasteners and a right angular contact ball bearing, the right swing arm has a right pivot joint at one end and a right wheel hub at the other end, the right torque shaft, the right countersink fasteners and the right angular contact ball bearing are fitted into a right receptacle at the right pivot joint, and the right wheel hub of the right front wheel is pivotally connected to the right swing arm via a right wheel axle;

a cruciform assembly comprised of:
a steerer tube that allows the coupled tilting steering and an embedded independent shock absorbing swing arm system to pivot about an Axis A; a main axle wherein the left swing arm assembly and right swing arm assembly are fitted to allow the left swing arm assembly and right swing arm assembly to swing about the main axle, the main axle is aligned with an Axis B, and a cruciform housing that fixes the steerer tube and the main axle in a perpendicular fashion;
a left steering-tilting linkage comprised of:
a let tie rod body and ball joint type bearings at each end, the left steering-tilting linkage is pivotally connected at one end to the lug of the left suspension module housing assembly, and at the other end is pivotally connected to the left side of a steering-tilting axle of the lower head tube fitting; and
a right steering-tilting linkage comprised of:
a right tie rod body and ball joint type bearings at each end, the right steering-tilting linkage is pivotally connected at one end to the lug of the right suspension module housing assembly, and the other end is pivotally connected to the right side of the steering-tilting axle of the lower head tube fitting;
wherein the steering down tube is rigidly connected to a protruding section of the steerer tube of the cruciform assembly over the top of the upper head tube and an industrial standard hidden internal compression (HIC) system using a clamping system.

6. The personal mobility vehicle of claim 5 wherein the left wheel hub includes a built-in toe angle and a chamber angle, and a machined bore hole formed there through is protected with a bushing.

7. The personal mobility vehicle of claim 5 wherein the right wheel hub includes a built-in toe angle and a chamber angle, and a machined bore hole formed there through is protected with a bushing.

8. The personal mobility vehicle of claim 5 wherein the left torque shaft and the right torque shaft each include four segments: a segment one is a flange at one end, a segment two is a square shape section, a segment three is a circular section and a segment four at the other end is a square section; a circular hollow centre formed through an entire length of each of the left torque shaft and the right torque shaft; and each of the left torque shaft and the right torque shaft, respectively, is fitted into a square shaped receptacle and securely fastened with countersink fasteners at the flange to a left pivot hole of the left swing arm and a right pivot hole of the right swing arm.

9. The personal mobility vehicle of claim 5 wherein the cruciform assembly is sandwiched between the upper head tube and the lower head tube fitting, and the steerer tube is pivotally secured using a headset bearing system and the industrial standard hidden internal compression (HIC) system.

10. The personal mobility vehicle of claim 9 wherein the headset bearing system is comprised of three headset bearings: two headset bearings fitted to the upper head tube machined bore hole and one headset bearing fitted to the lower head tube fitting, the headset bearing system includes a lubricant, a plurality of rubber seals, and a plurality of dust caps, which are applied to ensure a smooth, water-free and dust-free rotation of the cruciform assembly and hence the coupled steering tilting and suspension system swing arm about the Axis A, the cruciform assembly is further secured to the lower head tube fitting along the direction of the Axis A using a thrust bearing secured firmly together with a fastener, a plurality of washers, and a lock nut.

11. The personal mobility vehicle of claim 5 wherein each of the let tie rod body and the right tie rod body may be fixed in length or adjustable in length to enable altering a ground clearance of the vehicle.

12. The personal mobility vehicle of claim 5 wherein the coupled tilting steering and embedded independent shock absorbing swing arm system is connected to a coupled tilting steering swing arm system without suspension function.

13. The personal mobility vehicle of claim 12 wherein the coupled tilting steering swing arm system comprises:
- a rigid left suspension module housing swing arm system without a left torsion rubber suspension module, a left torque shaft, a left countersink fasteners, and a left tapered roller bearing; and
- a rigid right suspension module housing swing arm system without a right torsion rubber suspension module, a right torque shaft, a plurality of right countersink fasteners, and a right tapered roller bearing.

14. The personal mobility vehicle of claim 13 wherein the coupled tilting steering and embedded independent suspension swing arm system is symmetrical about the Axis A.

15. The personal mobility vehicle of claim 14 further comprising: a lower head tube fitting comprised of a steering-tilting axle located below the cruciform assembly.

16. The personal mobility vehicle of claim 15 wherein lugs on the left suspension module housing and the right suspension module housing are connected, respectively, to the left steering-tilting linkage and the right steering-tilting linkage via shoulder bolts and are secured using lock nuts, and the left steering-tilting linkage and right steering-tilting linkage are each pivotally connected to the steering-tilting axle and secured using lock nuts.

17. The personal mobility vehicle of claim 1 wherein a left and a right embedded torsion rubber suspension module each includes a plurality of torsion rubber rods around a square inner casing and the left embedded torsion rubber suspension module and the right embedded torsion rubber suspension module are inserted into a left suspension module housing and into a right suspension module housing, respectively.

18. The personal mobility vehicle of claim 5 wherein a plurality of lightening holes and webs are formed in each of the left swing arm and the right swing arm, the cruciform housing, and the left suspension module housing and the right suspension module housing.

* * * * *